United States Patent
Matsui et al.

(10) Patent No.: US 8,666,459 B2
(45) Date of Patent: Mar. 4, 2014

(54) CELLULAR PHONE

(75) Inventors: Kiyoto Matsui, Miki (JP); Masakazu Taguchi, Kobe (JP); Hiroyasu Kawano, Akashi (JP); Satoshi Shimokawa, Kobe (JP); Akiyoshi Uchida, Akashi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/611,958

(22) Filed: Sep. 12, 2012

(65) Prior Publication Data

US 2013/0005408 A1      Jan. 3, 2013

Related U.S. Application Data

(63) Continuation of application No. PCT/JP2010/054873, filed on Mar. 19, 2010.

(51) Int. Cl.
*H04M 1/00* (2006.01)
*H04K 3/00* (2006.01)

(52) U.S. Cl.
USPC .......................................... 455/573; 320/108

(58) Field of Classification Search
USPC .......................................... 455/573; 320/108
See application file for complete search history.

(56) References Cited

U.S. PATENT DOCUMENTS

| | | | |
|---|---|---|---|
| 7,916,467 B2 * | 3/2011 | Hotelling et al. | 361/679.41 |
| 2007/0052600 A1 | 3/2007 | Kamitani et al. | |
| 2009/0140690 A1 | 6/2009 | Jung | |
| 2009/0281678 A1 | 11/2009 | Wakamatsu | |
| 2010/0052431 A1 | 3/2010 | Mita | |

FOREIGN PATENT DOCUMENTS

| | | |
|---|---|---|
| EP | 1 892 794 | 2/2008 |
| EP | 2 066 000 | 6/2009 |
| JP | 08-046671 | 2/1996 |
| JP | 10-004639 | 1/1998 |
| JP | 2005-333244 | 12/2005 |
| JP | 2006-351714 | 12/2006 |
| JP | 2009-136132 | 6/2009 |
| JP | 2009-278707 | 11/2009 |
| JP | 2010-63245 | 3/2010 |
| WO | WO 2006/134913 | 12/2006 |
| WO | WO 2009/031639 | 3/2009 |
| WO | WO 2009/069859 | 6/2009 |

OTHER PUBLICATIONS

Japanese Office Action dated Jun. 18, 2013, issued in corresponding Japanese Patent Application No. 2012-505424 (Full Translation).
International Search Report issued in Int'l. App. No. PCT/JP2010/054873, dated Jun. 15, 2010.

* cited by examiner

*Primary Examiner* — Lee Nguyen
(74) *Attorney, Agent, or Firm* — Greer Burns & Crain Ltd.

(57) ABSTRACT

Cellular phones include a power reception resonance coil arranged inside a first outer surface side of a housing, a power extracting unit for extracting power of an induction current of the power reception resonance coil, a magnetic core that has one end arranged inside the first outer surface side and the other end arranged inside a second outer surface side of the housing, and penetrates into the power reception resonance coil, and a printed board that is arranged in a space between the first outer surface and the second outer surface and has an area where circuit elements are not arranged on a periphery of the core.

10 Claims, 14 Drawing Sheets

F I G. 7 A
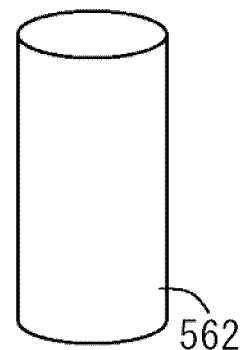
F I G. 7 B
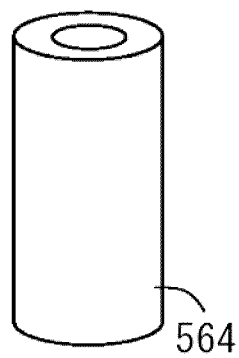

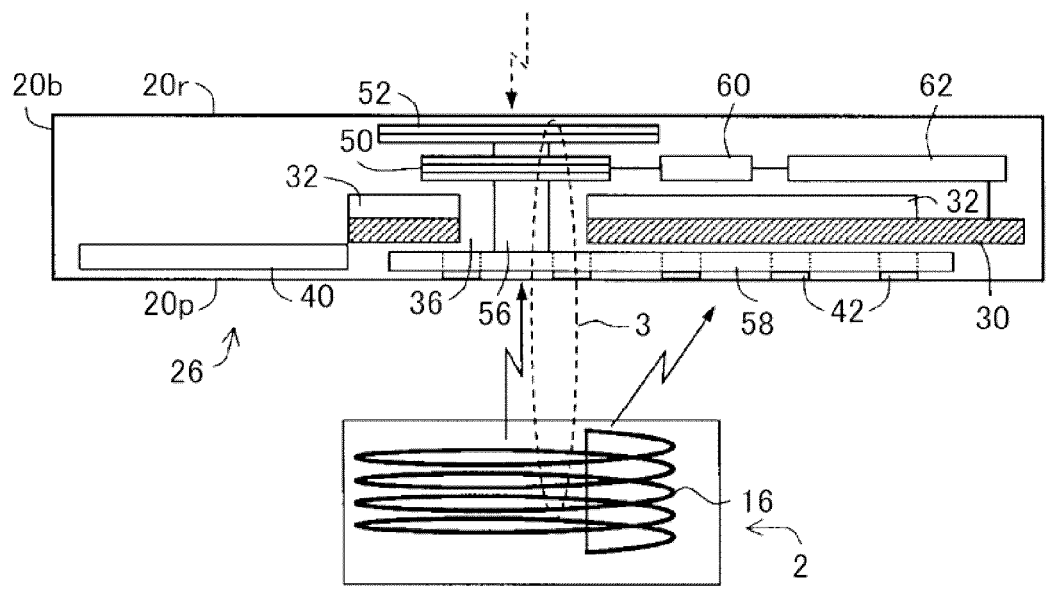
F I G. 9 A
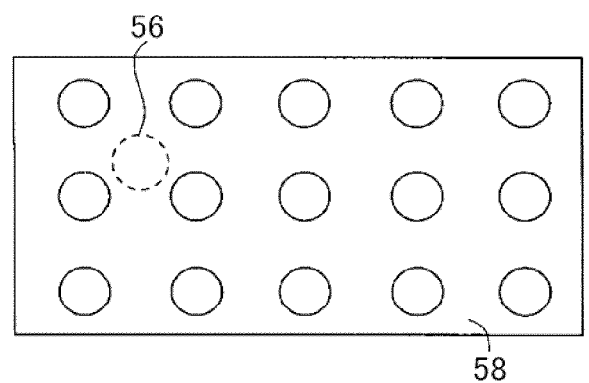
F I G. 9 B

CELLULAR PHONE

CROSS-REFERENCE TO RELATED APPLICATION

This application is a continuation application of International Application PCT/JP2010/054873 filed on Mar. 19, 2010 and designated the U.S., the entire contents of which are incorporated herein by reference.

FIELD

The present invention relates to an electronic device, and more particularly, to a cellular phone that can receive power with a wireless power supply method.

BACKGROUND

Known wireless power supply techniques include a power supply using electromagnetic induction, and a power supply using radiowaves. In the meantime, a power supply using magnetic resonance has been proposed in recent years.

With the wireless supply method using magnetic resonance, for example, a resonance coil having a certain resonance frequency is arranged in a power transmission device, and a resonance coil having the same resonance frequency as that of the power transmission device is arranged in a power reception device. Magnetic field coupling that enables an electromagnetic energy transfer is caused by magnetic resonance between the power transmission device and the power reception device, so that power is efficiently transmitted from the resonance coil of the power transmission device to that of the power reception device with the magnetic field coupling.

With the power supply method using magnetic resonance, power higher than that with the power supply method using radiowaves can be supplied, and a power transmission distance can be prolonged or a power transmission coil can be reduced in size in comparison with that of the power supply method using electromagnetic induction.

A certain known cellular phone includes a main antenna for a communication, which is connected to a wireless unit within a housing and intended to make a communication with radiowaves, and loop-shaped electromagnetic antennas each of which is connected to an IC module within the housing and intended to contactlessly transmit/receive data between an external device and the IC module with electromagnetic induction. In the cellular phone, the loop-shaped electromagnetic antennas are arranged on a back surface provided with a battery cover and a side surface of the housing. Thus, the cellular phone can contactlessly transmit/receive various types of data to/from an external device on both a front surface side and the back surface side.

A certain known cordless telephone device includes a handset, and a charging unit on which the handset is placed selectively by normally orientating a key operation part downward or by turning over the key operation part upward. The charging unit includes an oscillator circuit, and a primary coil connected to the oscillator circuit. The handset includes a battery for a power source, a secondary coil for generating an alternating current with electromagnetic induction by AC-oscillating the primary coil in a state where the handset is placed on the charging unit, and a rectifying smoothing circuit for supplying an output of the secondary coil to the battery. In a concave portion of the charging unit, on which the handset is placed, at least two pairs of protrusions for supporting the handset are provided. The cordless telephone device has a bottom surface that is provided on a side opposite to the key operation unit of the handset and separates a speaker for amplifying voice when the handset is placed via at least the two pairs of protrusions by being turned over.

A certain known portable communication device has a cover rotatable about an axis part. The portable communication device also includes a unit to be charged, which includes a power reception coil core around which a power reception coil is wound, and a secondary battery, and forms a main body of the portable communication device, and a charging unit having a power transmission coil core around which a power transmission coil is wound. The power reception coil core is formed in the shape of a bar, and included in an axis part of the unit to be charged in the main body of the portable communication device. Moreover, part of the power transmission coil core faces both ends of the power reception coil core formed in the shape of the bar in a state where the unit to be charged is placed on the charging unit. Thus, a contactless power transmission efficiency using electromagnetic induction between the coils of the charging unit and the unit to be charged can be increased regardless of the shape of the bottom part of the main body of the portable communication device.

Patent Document 1: Japanese Laid-Open Patent Publication No. 2005-333244

Patent Document 2: U.S. Pat. No. 3,514,519 (Japanese Laid-Open Patent Publication No. HEI8-46671)

Patent Document 3: Japanese Laid-Open Patent Publication No. HEI10-4639

SUMMARY

The inventor et al. recognized that if a magnetic body or a conductor is present between two resonance coils for a power transmission and a power reception when the wireless power supply method using magnetic resonance is applied to an electronic device such as a cellular phone, magnetic fields of resonance frequencies of the resonance coils become turbulent, affecting a power supply. For example, if the power reception resonance coil is arranged on a surface side opposite to an operation surface within the cellular phone, power can be supplied from a back surface side to the power reception resonance coil. However, since a printed circuit board is present on the operation surface side within the cellular phone and positioned on a power transmission path, it is difficult to supply power from the operation surface side to the power reception resonance coil.

According to one aspect (characteristic) of the embodiments of the present invention, a cellular phone includes: a housing; a power reception resonance coil that receives transmitted magnetic field energy with magnetic resonance and is arranged inside a first outer surface side of the housing; a power extracting unit for extracting power of an induction current generated by the power reception resonance coil; a magnetic core that has one end arranged inside the first outer surface side of the housing and the other end arranged inside a second outer surface side of the housing, and penetrates into the power reception resonance coil; and a printed circuit board which is arranged in a space between the first outer surface and the second outer surface of the housing, on which circuit elements are mounted, and which has an area where circuit elements are not arranged on a periphery of the core.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A and 7B illustrate examples of the shape of a core;

FIG. 9A illustrates a still further schematic example of an internal structure of a cellular phone according to a still further embodiment, which can receive power through both of an outer surface of a primary power reception side and that of a secondary power reception side of a housing or an outer sheath with a wireless power supply method using magnetic resonance;

FIG. 9B illustrates the shape of a magnetic plate as an extended portion of a core;

DESCRIPTION OF EMBODIMENTS

Figure 1A:
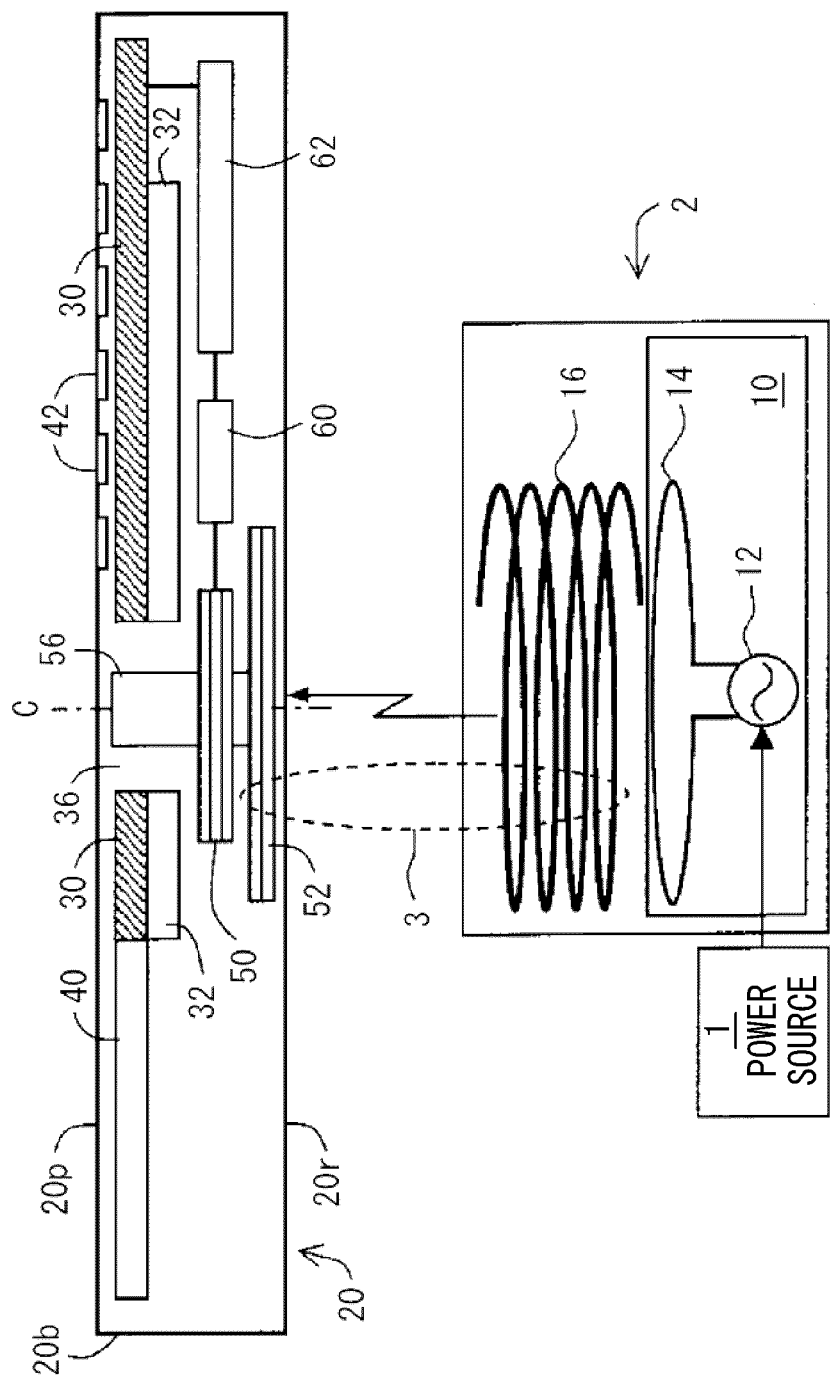
FIGS. 1A and 1B illustrate a schematic example of an internal structure of a cellular phone according to an embodiment, which can receive power through both of an outer surface of a primary power reception side and an outer surface of a secondary power reception side of a housing or an outer sheath with a wireless power supply method using magnetic resonance.

It is to be understood that both the foregoing general description and the following detailed description are exemplary and explanatory and are not restrictive of the invention, as claimed.

Non-limiting embodiments according to the present invention are described with reference to the drawings. In the drawings, like components and elements are denoted with like reference numerals.

Figure 1B:
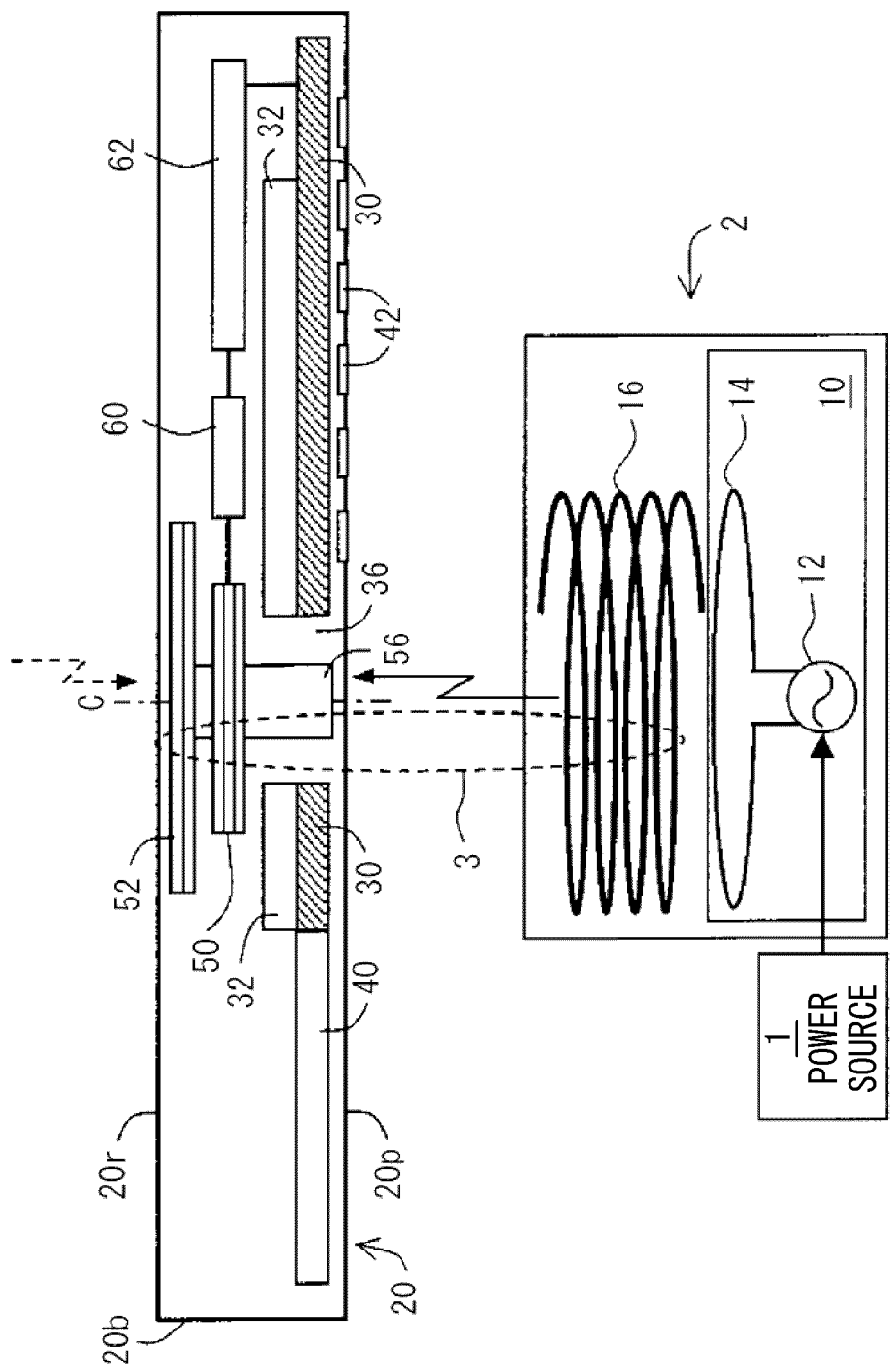

FIGS. 1A and 1B illustrate a schematic example of an internal structure of a cellular phone 20 according to an embodiment as an electronic device that can receive power through both of an outer surface 20r of a primary power reception side and an outer surface 20p of a secondary power reception side of a housing or an outer sheath 20b with a wireless power supply method using magnetic resonance. In FIGS. 1A and 1B, the cellular phone 20 is illustrated in a form implemented by cutting away its frontward side surface.

In FIG. 1A, the cellular phone 20 is arranged to receive power from a power transmission device 2 through the outer surface 20r of the primary power reception side with a wireless power supply method using magnetic resonance. In FIG. 1B, the cellular phone 20 is arranged to receive power from the power transmission device 2 through the outer surface 20p of the secondary power reception side with the wireless power supply method using magnetic resonance. In this case, the cellular phone 20 is a cellular phone of a so-called straight type or a non-partitioning type.

The cellular phone 20 includes, as a power reception device, a power reception resonance coil 52, a power extracting unit or circuit 50 for extracting power, and a magnetic core 56 having a high magnetic permeability, and further includes a charging circuit 60, and a rechargeable battery 62. The core 56 may penetrate into the power reception resonance coil 52, and a surface at its one end may align with a coil surface at an end in an axis direction of the power reception resonance coil 52 in a central axis C direction. The cellular phone 20 further includes a printed circuit board (PCB) or printed board 30 on which a plurality of circuit components 32 such as a processor, a memory and a wireless transmitter/receiver are mounted, and a display device 40 such as a liquid crystal display device or an organic EL display device. The cellular phone 20 still further includes an antenna, a speaker, a receiver, and a microphone (not illustrated). The cellular phone 20 may still further include a plurality of keys 42 for an input or an operation.

A housing 20b of the cellular phone 20 is made of resin or plastic as a main material. For example, a glass paper phenol board, a paper epoxy board, a glass/composite board, a glass/epoxy board, a fluorine resin (Teflon (registered trademark)) board, and a flexible board of a one-sided type, a two-sided type, or a multi-layer type are available as the printed circuit board (30). The magnetic core 56 may be made of, for example, ferrite. The core 56 may have a length of, for example, approximately 5 to 12 mm in the axis C direction, and a cross-sectional area, for example, of approximately 20 to 200 mm² vertical to the axis C. A shape of the cross-section of the core 56 may be, for example, a circle having a diameter of approximately 5 to 12 mm, a square or a rectangle having lengths of horizontal and vertical sides of approximately 3 to 20 mm, or an ellipse having lengths of short and long axes of approximately 3 to 20 mm.

The outer surface 20r of the primary power reception side and the outer surface 20p of the secondary power reception side may be surfaces that are opposite to each other in the housing 20b. The core 56 extends in the axis C direction between a neighborhood of an inner wall of an outer sheath of the housing 20b on the outer surface 20r of the primary power reception side of the cellular phone 20 and a neighborhood of an inner wall of an outer sheath of the housing 20b on the outer surface 20p of the secondary power reception side. On the printed circuit board 30, an opening or a space 36 into which the core 56 penetrates may be formed. The opening 36 of the printed circuit board 30 may have an opening edge having a distance or an interval of approximately 1 mm or more or approximately 2 mm or more from a round surface of the core 56. Alternatively, the opening 36 may make contact with the round surface of the core 56.

The power extracting unit 50 can be mounted on a printed circuit board different from the printed circuit board 30. An electromagnetic induction coil of the power extracting unit 50 may be formed by forming a plurality of coil patterns on multiple conductor layers with the use of one or more printed circuit boards and by mutually connecting the patterns among the conductor layers. The charging circuit 60 may be mounted on the printed circuit board 30 along with other circuit elements 32.

The power transmission device 2 includes a power supply unit or circuit 10 for transmitting power, and a power transmission resonance coil 16. In the power transmission device 2, the power supply unit 10 includes an oscillator circuit 12, and preferably includes a power supply coil or electromagnetic induction coil 14. The oscillator circuit 12 is connected, for example, to an external direct current power source 1 or an alternating current (AC) driving unit of a commercial rated voltage (such as 10 V) in conformity with the specification of the oscillator circuit 12. The power transmission resonance coil 16 may be a coil having both ends that are released structurally, or may be a coil having both ends that are electrically connected via a conductor. The power transmission resonance coil 16 may arbitrarily have a capacitor for regulating a capacitance C.

In the cellular phone 20, the printed circuit board 30 on which the circuit components 32 are mounted can be arranged, for example, in a neighborhood inside a user input operation surface on which a plurality of keys 42 are arranged. Preferably, the power reception resonance coil 52 and the power extracting unit 50 are arranged inside the surface (20r) opposite to the user input operation surface (20p), on which the printed circuit board 30 and the circuit elements 32 are arranged, in order to eliminate or significantly reduce possible power absorption caused by the printed circuit board 30 and the circuit elements 32.

Similarly to the power transmission resonance coil 16, the power reception resonance coil 52 may be a coil having both ends that are released structurally, or may be a coil having both ends that are electrically connected via a conductor. The power reception resonance coil 52 may arbitrarily have a capacitor for regulating a capacitance C.

Preferably, the power extracting unit 50 includes a power extraction coil or an electromagnetic induction coil for extracting power from the power reception resonance coil 52. The power extracting unit 50 supplies power extracted from the power reception resonance coil 52 to the charging circuit 60 as an alternating current.

The charging circuit 60 is linked to the power extraction coil of the power extracting unit 50. The charging circuit 60 may include, for example, an AC (alternating current)-to DC (direct current) voltage converter, a rectifying circuit, a charge control circuit and the like. The charging circuit 60 supplies a direct current voltage to the battery 62.

In FIG. 1A, magnetic field coupling or a coupled magnetic field 3 is formed between the power transmission resonance coil 16 and the power reception resonance coil 52 with magnetic resonance in a predetermined distance range. A resonance frequency ft of the power transmission resonance coil 16 and a resonance frequency fr of the power reception resonance coil 52 are the same or substantially the same. The power transmission resonance coil 16 can transmit electromagnetic energy or power to the power reception resonance coil 52 with coupling caused by magnetic resonance. Coupling caused by magnetic resonance is effective even if a distance between the power transmission resonance coil 16 and the power reception resonance coil 52 is longer than a distance that causes electromagnetic induction.

A range where the resonance frequencies ft and fr are substantially the same may be a frequency range as long as a transmission efficiency higher than that produced by electromagnetic induction is achieved. For example, the range may be a frequency range where a Q value at a resonance point is half a maximum value.

The power transmission resonance coil 16 may be, for example, a helical coil that is made of copper and has a diameter of approximately 2 cm or more. The power reception resonance coil 52 may be, for example, a helical coil that is made of copper and has a winding shape of a circle, an ellipse or a square (rectangle) having a maximum diameter of approximately 5 cm or less. A distance between the power transmission resonance coil 16 and the power reception resonance coil 52 may be, for example, 0.1 cm or more. The resonant frequencies ft and fr may be, for example, 0.1 to 20 MHz.

Each of the power transmission resonance coil 16 and the power reception resonance coil 52 is formed, for example, with one coil, and has an inductance L and a capacitance C, which satisfy a resonance condition. The capacitance C can be formed with a floating capacitance of the power transmission resonance coil 16 or the power reception resonance coil 52. The capacitance C may be regulated with the capacitance of the capacitor linked to the power transmission resonance coil 16 or the power reception resonance coil 52.

An impedance Z of each of the power transmission resonance coil 16 and the power reception resonance coil 52 is represented with the following equation.

$$Z = R + i(\omega L - 1/\omega C)$$

where R represents a combined resistance of an internal resistance of the power transmission resonance coil 16 or the power reception resonance coil 52 and/or an internal resistance of the capacitor, and ω represents an angular frequency or an angular speed.

An LC resonance frequency f (Hz)=ω/2π of each of the power transmission resonance coil 16 and the power reception resonance coil 52 is represented with the following equation.

$$f=1/(2\pi(LC)^{1/2})$$

To increase the Q value (=1/R×(L/C)$^{1/2}$), the oscillator circuit 12 may not be directly connected to the power transmission resonance coil 16. The Q value that represents sharpness of resonance is determined with a resistance and a radiation resistance of a coil and a capacitor, and the Q value increases as their combined resistance value R decreases.

By using the power transmission resonance coil 16 and the power reception resonance coil 52, which satisfy the resonance condition (ft=fr), the power reception resonance coil 52 resonates with a magnetic field formed by the power transmission resonance coil 16, so that an alternating current is generated.

In the power transmission device 2, the oscillator circuit 12 of the power supply unit 10 supplies power to the power supply coil 14. The oscillator circuit 12 directly or indirectly supplies power to the power supply coil 14, for example, at the resonance frequency ft for magnetic resonance. An oscillation frequency of the oscillator circuit 12 may be a frequency different from the resonance frequency ft of the power transmission resonance coil 16.

The power supply coil 14 may supply power fed from the oscillator circuit 12 to the power transmission resonance coil 16 with electromagnetic induction. In this case, the power transmission resonance coil 16 and the power supply coil 14 are arranged in a short range where power can be supplied with electromagnetic induction, and the resonance frequency of the power supply coil 14 does not need to be taken into account.

In this way, the power transmission resonance coil 16 efficiently supplies power to the power reception resonance coil 52 with electromagnetic resonance.

In the cellular phone 20, the power reception resonance coil 52 receives power from the power transmission resonance coil 16 with magnetic field coupling caused by magnetic resonance. The power reception resonance coil 52 supplies the received power or current to the power extracting unit 50. The power extracting unit 50 may receive power from the power reception resonance coil 52 with the power extraction coil (50) with the use of electromagnetic induction. In this case, the power reception resonance coil 52 and the power extracting unit (50) are arranged in a short range where power is supplied with electromagnetic induction, and the resonance frequency of the power extracting unit (50) does not need to be taken into account.

The power extraction coil (50) supplies an alternating current to the charging circuit 60 as a load. The charging circuit 60 is adapted to rectify the alternating current and to supply a direct current to the battery 62. The battery 62 supplies a direct current voltage needed in the cellular phone 20.

Figure 2A:
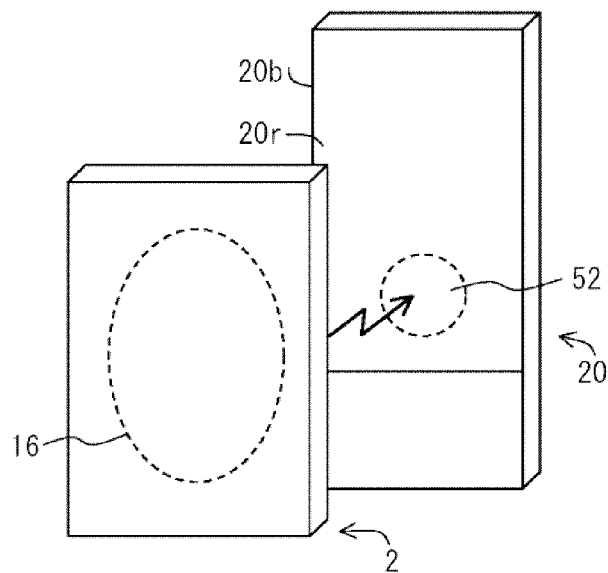
FIG. 2A illustrates a spatial arrangement in a case where power is wirelessly supplied from a power transmission device to a power reception resonance coil through an outer surface of a primary power reception side of a cellular phone.
Figure 2B:
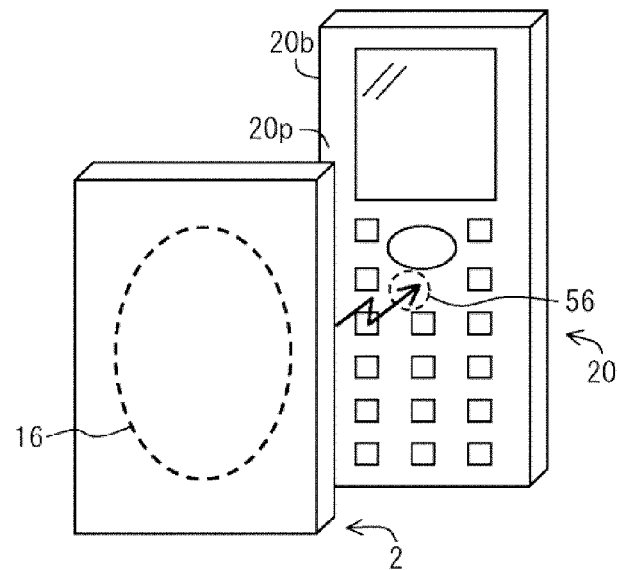
FIG. 2B illustrates a spatial arrangement in a case where power is wirelessly supplied from the transmission device 2 to the power reception resonance coil through an outer surface of a secondary power reception side of the cellular phone.

FIG. 2A illustrates a spatial arrangement in a case where power is wirelessly supplied from the power transmission device 2 to the power reception resonance coil 52 through the outer surface 20r of the main power reception side of the cellular phone 20. FIG. 2B illustrates a spatial arrangement in a case where power is supplied from the power transmission device 2 to the power reception resonance coil 52 through the outer surface 20p of the secondary power reception side of the cellular phone 20.

In FIGS. 1A and 2A, power can be efficiently supplied to the power reception resonance coil 52 through the outer surface 20r of the primary power reception side of the cellular phone 20. In the meantime, if the opening 36 and the core 56 are not present in FIGS. 1B and 2B, the printed circuit board 30 and the circuit elements 32 are positioned on a power transmission path or in a magnetic field coupling space (3) on the side of the operation surface (20p) within the cellular phone 20. Accordingly, the magnetic field 3 generated by the power transmission resonance coil 16 is shielded by the printed circuit board 30 and the circuit elements 32, and it is difficult to efficiently supply power to the power reception resonance coil 52 through the operation surface (20p). However, a user does not always orientate and arrange the outer surface 20r of the primary power reception side of the cellular phone 20 toward the power transmission device 2 as illustrated in FIGS. 1A and 2A in order to charge power.

In FIGS. 1B and 2B, the opening 36 and the magnetic core 56 are present. Therefore, even if the printed circuit board 30 on which the plurality of circuit elements 32 are mounted is present on the operation surface (20p) side within the cellular phone 20, power can be efficiently supplied to the power reception resonance coil 52 through the outer surface 20p of the secondary power reception side and the core 56. Namely, the coupled magnetic field 3 concentrates with a higher density and passes through the core 56 as a magnetic element that forms a magnetic circuit.

Figure 3:
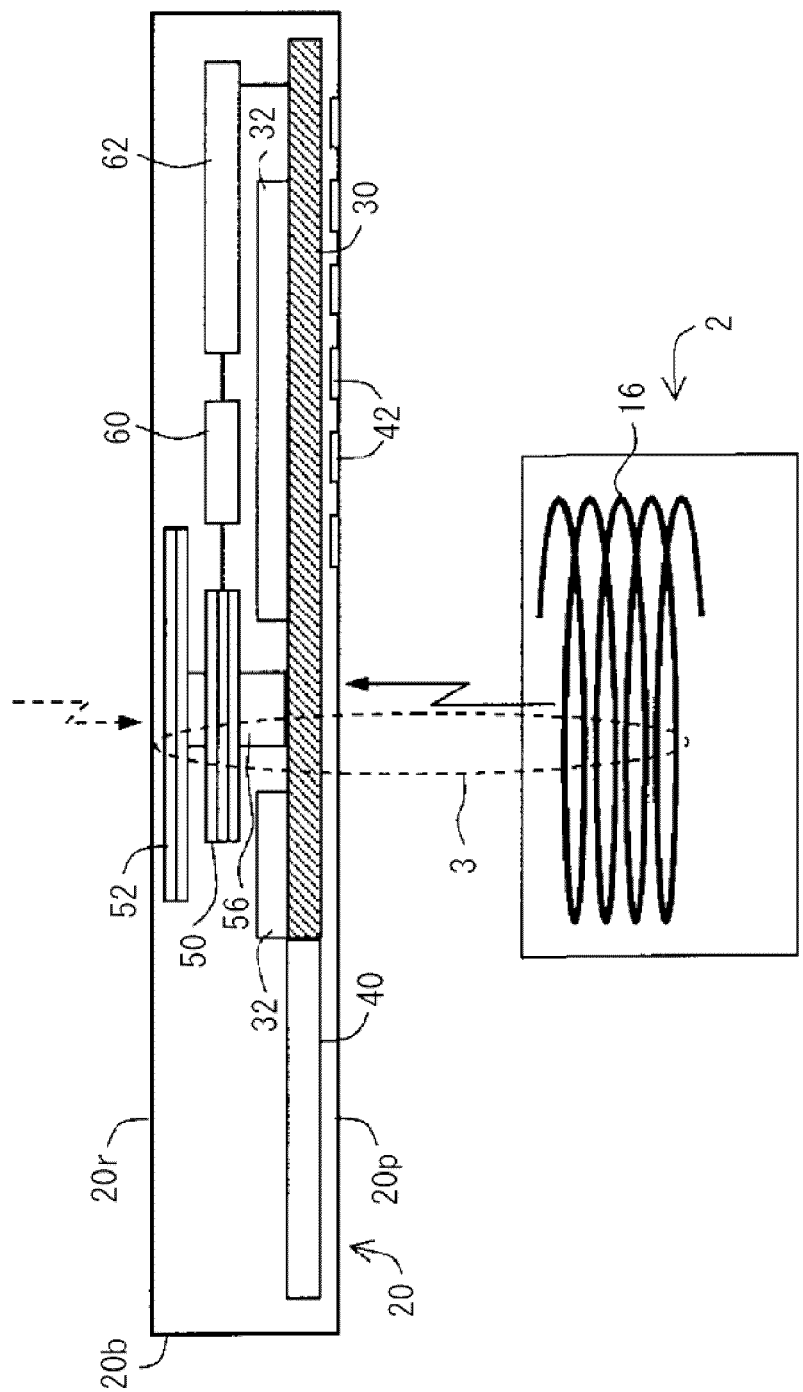
FIG. 3 illustrates another schematic example of an internal structure of a cellular phone according to another embodiment, which can receive power through both of an outer surface of a primary power reception side and that of a secondary power reception side of a housing or an outer sheath with a wireless power supply method using magnetic resonance.

FIG. 3 is a modification of the embodiment of FIGS. 1A and 1B, and illustrates another schematic example of an internal structure of the cellular phone 20 according to another embodiment, which can receive power through both of the outer surface 20r of the primary power reception side and the outer surface 20p of the secondary power reception side of the housing 20b with a wireless power supply method using magnetic resonance. In FIG. 3, the cellular phone 20 is illustrated in a form implemented by cutting away its side surface. In FIG. 3, the cellular phone 20 is arranged to receive power from the power transmission device 2 through the outer surface 20p of the secondary power reception side with the wireless power supply method using magnetic resonance.

In this case, on the printed circuit board 30, a conductor layer or a conductor pattern is not formed or removed in the neighborhood of the core 56, and the circuit elements 32 other than the core 56 are not arranged. Since an opening for the core 56 is not present on the printed circuit board 30, a process step of forming an opening on the printed circuit board 30 at the time of manufacturing becomes unnecessary. Moreover, the core 56 can be fixed in an area where a conductor layer is not formed on the printed circuit board 30. The rest of the structure, material and operations of the cellular phone 20 illustrated in FIG. 3 are similar to those of FIGS. 1A and 1B.

Figure 4A:
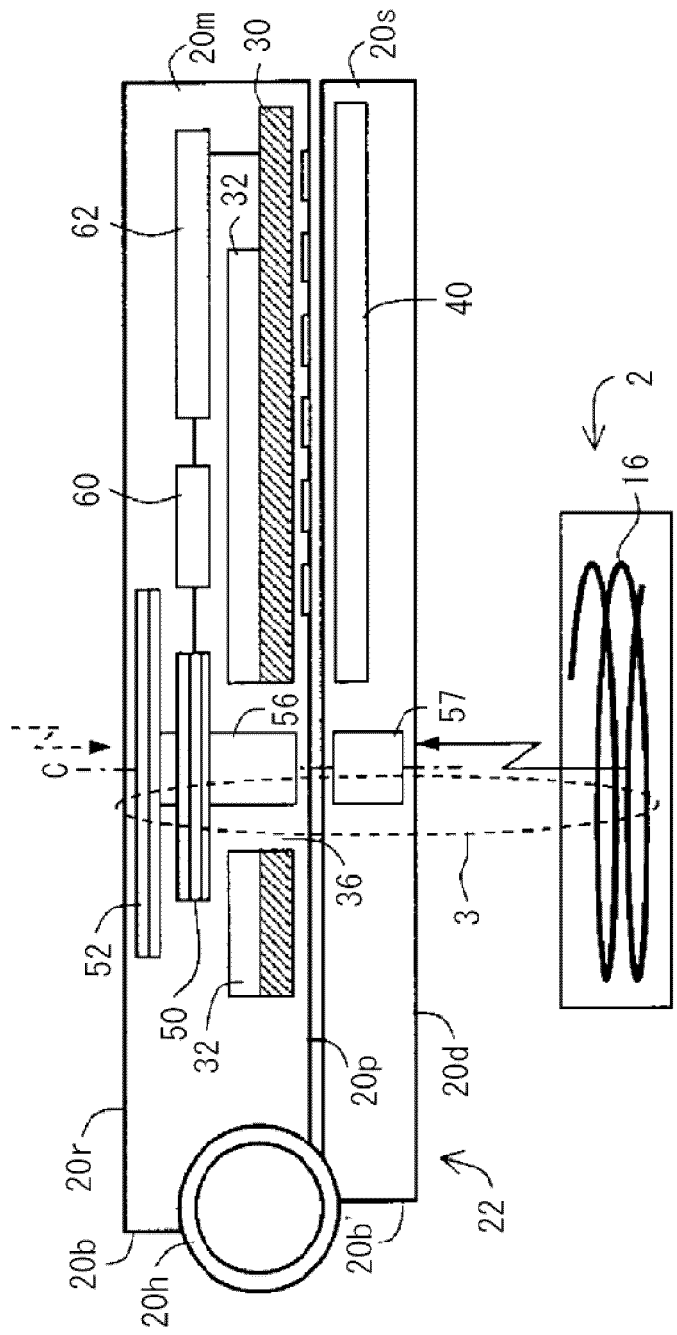
FIGS. 4A and 4B illustrate a further schematic example of an internal structure of a cellular phone according to a further embodiment, which can receive power respectively through an outer surface of a primary power reception side, that of a secondary power reception side, and that of a tertiary power reception side of a housing or an outer sheath with a wireless power supply method using magnetic resonance.
Figure 4B:
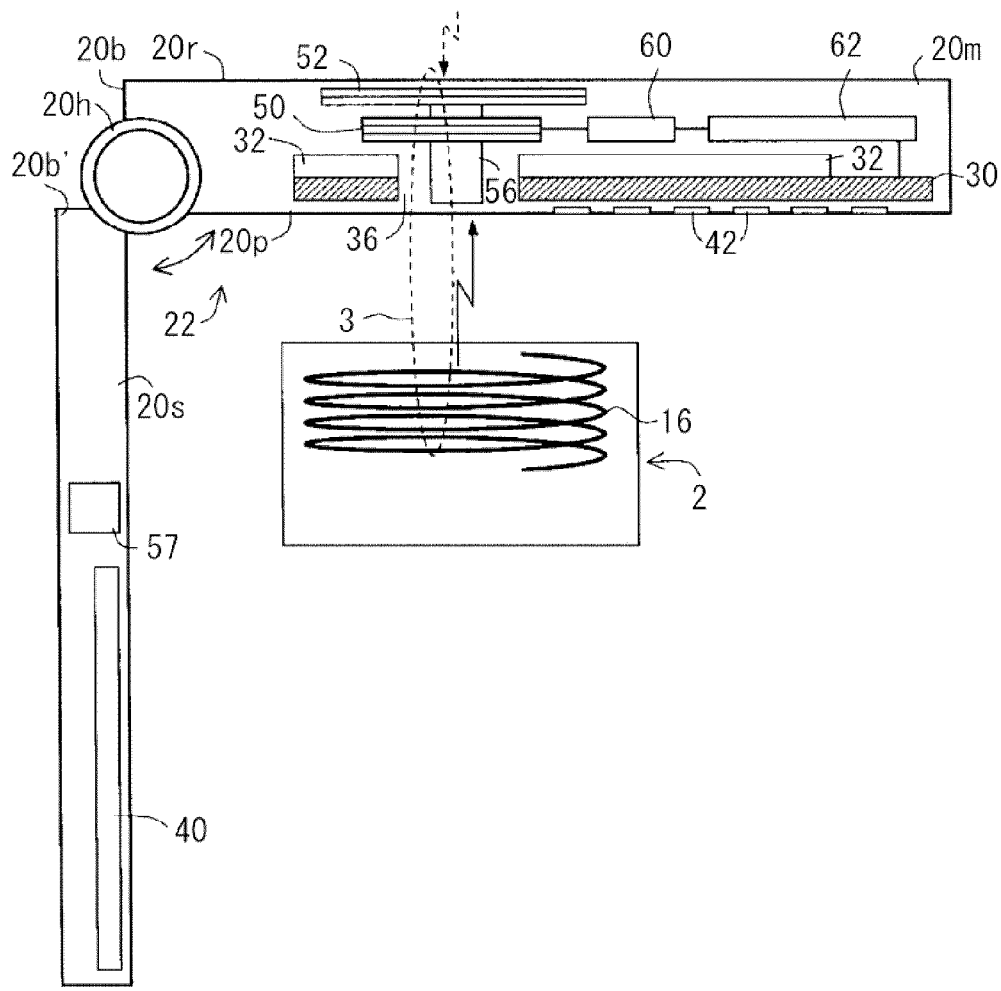

FIGS. 4A and 4B illustrate a further example of an internal structure of a cellular phone 22 according to a further embodiment, which can receive power respectively through an outer surface 20r of a primary power reception side and an outer surface 20p of a secondary power reception side of a housing 20b, and an outer surface 20d of a tertiary power reception side of a housing 20b' with a wireless power supply method using magnetic resonance. FIGS. 4A and 4B illustrate another modification of the embodiment of FIGS. 1A and 1B. In FIGS. 4A and 4B, the cellular phone 22 is illustrated in a form implemented by cutting away its side surface. In this case, the cellular phone 22 is a cellular phone of, a so-called folding type.

In FIG. 4A, the cellular phone 22 is arranged to receive power from the power transmission device 2 through the outer surface 20d of the tertiary power reception side with a wireless power supply method using magnetic resonance in a folded state. In FIG. 4B, the cellular phone 22 is arranged to receive power from the power transmission device 2 through the outer surface 20p of the secondary power reception side with the wireless power supply method using magnetic resonance in an open state changed from the folded state.

The cellular phone 22 has a form implemented by partitioning the cellular phone 20 of FIGS. 1A and 1B into a main unit 20m and a display unit 20s. The main unit 20m and the display unit 20s are linked by a hinge part 20h. The main unit 20m of the cellular phone 22 includes, as a power reception device, a power reception resonance coil 52, a power extracting unit or circuit 50, and a core 56. The main unit 20m also includes a charging circuit 60 and a rechargeable battery 62. The main unit 20m further includes a printed circuit board 30 on which a plurality of circuit elements 32 such as a processor, a memory and a wireless transmitter/receiver are mounted. The display unit 20s includes a display device 40. The display device 40 may be arranged on a surface opposite to the outer surface 20d of the tertiary power reception side of the display unit 20s. The main unit 20m may further include a plurality of keys 42 for an input. The cellular phone 22 additionally includes an antenna, a speaker, a receiver and a microphone (not illustrated) in either of the main unit 20m and the display unit 20s.

On the printed circuit board 30, an opening or space 36 in which a core 56 is made to penetrate is formed. The housings 20b, 20b' of the cellular phone 22 (20m, 20s) are made of resin or plastic as a main material.

In FIG. 4A, another core 57 is arranged coaxially with the core 56 in an extended line of the axis C of the core 56 within the main unit 20m inside the display unit 20s in a state where the display unit 20s is being folded from the main unit 20m. The core 57 extends between a neighborhood of an inner wall of an outer sheath of the housing 20b' on the outer surface 20d of the tertiary power reception side and a neighborhood of an inner wall of an outer sheath of the housing 20b' on an outer surface opposite to the outer surface 20d. The core 57 may have a length of, for example, approximately 1 to 10 mm in the axis C direction, and a cross-sectional area of, for example, approximately 20 to 200 mm$^2$ vertical to the axis C. Sizes of the cross-sections of the core 56 and the core 57 vertical to the axis C may not be the same. For example, the cross-sectional area of the core 57 may be larger than that of the core 56. If the sizes of the cross-sections of the core 56 and the core 57 vertical to the axis are not the same, the axes of the core 56 and the core 57 may not match.

In FIG. 4A, if the core 57 is not present within the display unit 20s, another element such as the display device 40 or the like lies in a range from the power transmission resonance coil 16 to the core 56 and to the power reception resonance coil 52 within the main unit 20m. Accordingly, the magnetic field 3 generated by the power transmission resonance coil 16 is shielded by a conductor portion of such another element, and a transmission efficiency of power to the power reception resonance coil 52 through the outer surface 20d of the tertiary power reception side can decrease.

In the meantime, the core 57 within the display unit 20s is present on the power transmission path 3 from the power transmission resonance coil 16 to the core 56 and to the power reception resonance coil 52. Therefore, even if the display unit 20s lies before the outer surface 20p of the secondary power reception side, power can be efficiently supplied from the outer surface 20d of the secondary power reception side to the power reception resonance coil 52 via the core 57 and the core 56. Namely, the coupled magnetic field 3 concentrates with a higher density and passes through the core 57 and the core 56 as magnetic elements or members that form a magnetic circuit.

A power reception form of the cellular phone 22 in FIG. 4B corresponds to that of the cellular phone 20 in FIG. 1B. The rest of the structure, materials, and operations of the cellular phone 22 of FIGS. 4A and 4B are similar to those of FIGS. 1A and 1B.

Figure 5A:
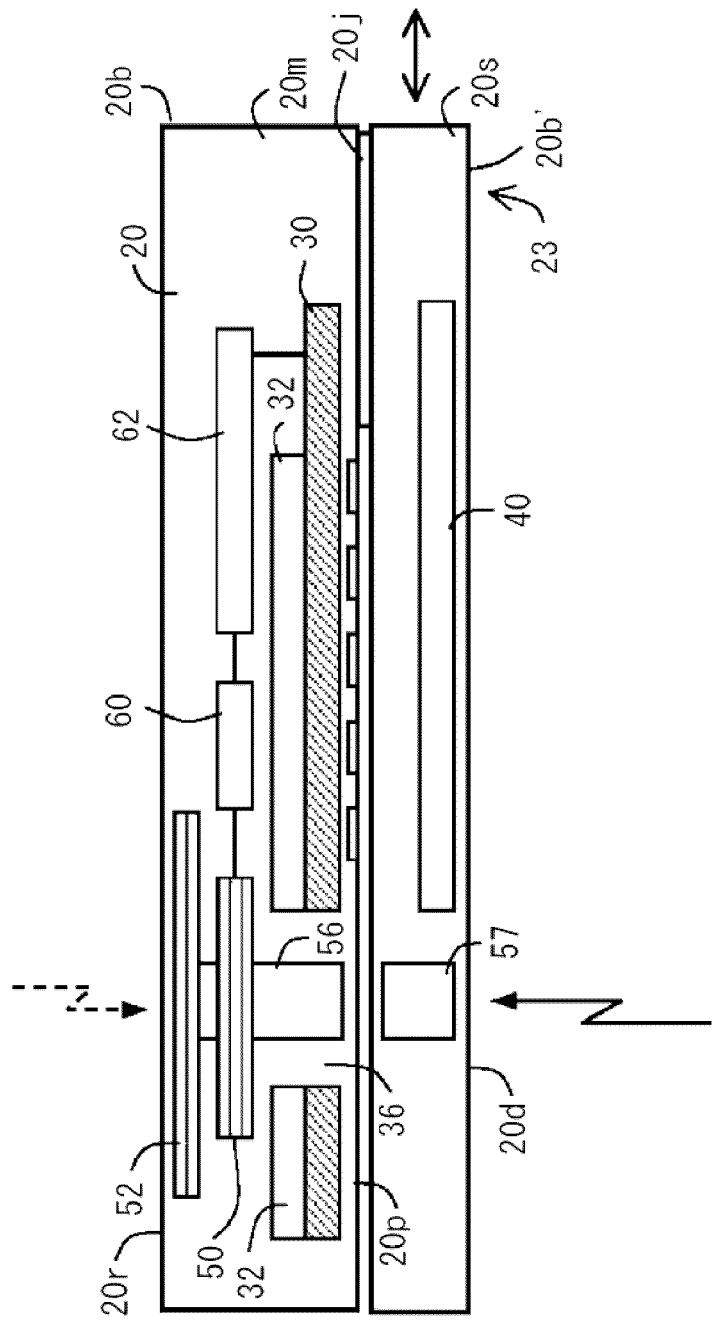
FIGS. 5A and 5B illustrate a still further schematic example of an internal structure of a cellular phone according to a still further embodiment, which can receive power respectively through an outer surface of a primary power reception side, that of a secondary power reception side, and that of a tertiary power reception side of a housing or an outer sheath with a wireless power supply method using magnetic resonance.
Figure 5B:
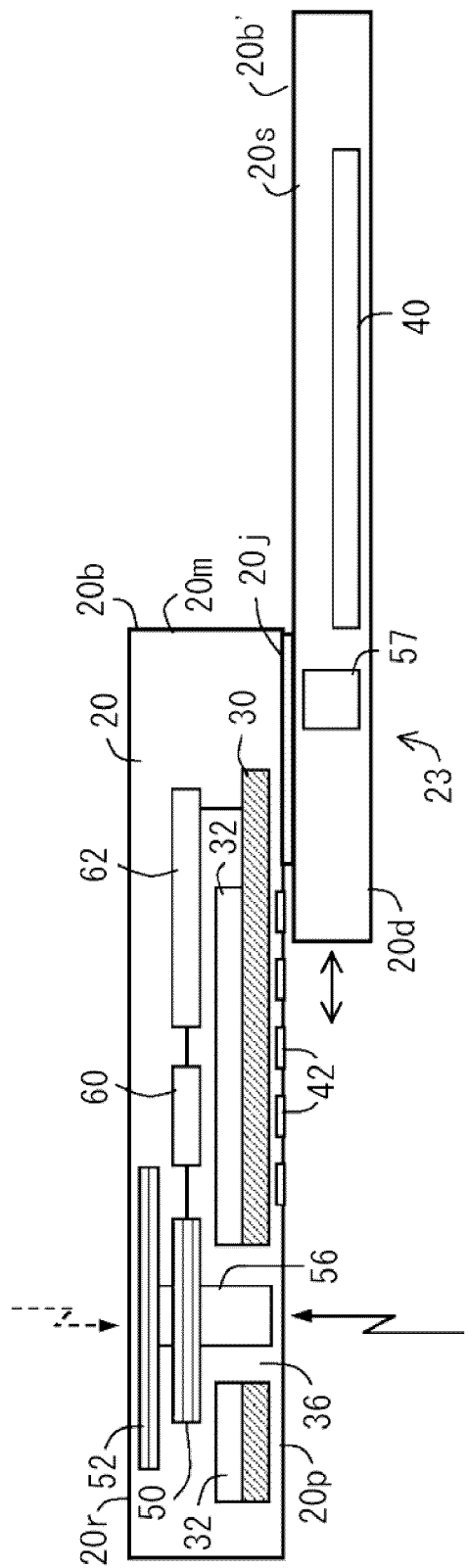

FIGS. 5A and 5B illustrate a further example of an internal structure of a cellular phone 23 according to a still further embodiment, which can receive power respectively through an outer surface 20r of a primary power reception side and an outer surface 20p of a secondary power reception side of the housing 20b, and an outer surface 20d of a tertiary power reception side of a housing 20b' with a wireless power supply method using magnetic resonance. FIGS. 5A and 5B illustrate a further modification of the embodiment of FIGS. 1A and 1B or FIGS. 4A and 4B. In FIGS. 5A and 5B, the cellular phone 23 is illustrated in a form implemented by cutting away its side surface. In this case, the cellular phone 23 is a cellular phone of a slide type.

In FIG. 5A, the cellular phone 23 is arranged to receive power from the power transmission device 2 through the outer surface 20d of the tertiary power reception side with a wireless power supply method using magnetic resonance in a closed state or a contracted state. In FIG. 5B, the cellular phone 23 is arranged to receive power from the power transmission device 2 through the outer surface 20p of the secondary power reception side with a wireless power supply method using magnetic resonance in an open state changed by sliding from the closed state.

The cellular phone 23 has a form implemented by partitioning the cellular phone 20 of FIGS. 1A and 1B into a main unit 20m and a display unit 20s, similarly to the form of the embodiment of FIGS. 4A and 4B. The main unit 20m and the display unit 20s are linked by a slide mechanism 20j. The display device 40 may be arranged on the outer surface 20d of the tertiary power reception side of the display unit 20s.

In FIG. 5A, another core 57 is arranged coaxially with the core 56 in an extended line of the core 56 within the main unit 20m inside the display unit 20s in an arrangement where the display unit 20s is contracted or accommodated to overlay on the main unit 20m.

The core 57 within the display unit 20s is present on the power transmission path 3 from the power transmission resonance coil 16 to the core 56 and to the power reception resonance coil 52. Therefore, even if the display unit 20s lies before the outer surface 20p of the secondary power reception side, power can be efficiently supplied from the outer surface 20d of the secondary power reception side to the power reception resonance coil 52 through the core 57 and the core 56.

A power reception form of the cellular phone 22 in FIG. 5B corresponds to that of the cellular phone 20 in FIG. 1B or the cellular phone 22 in FIG. 4B. The rest of the structure, materials, and operations of the cellular phone 23 of FIGS. 5A and 5B are similar to those of FIGS. 1A and 1B.

Figure 6A:
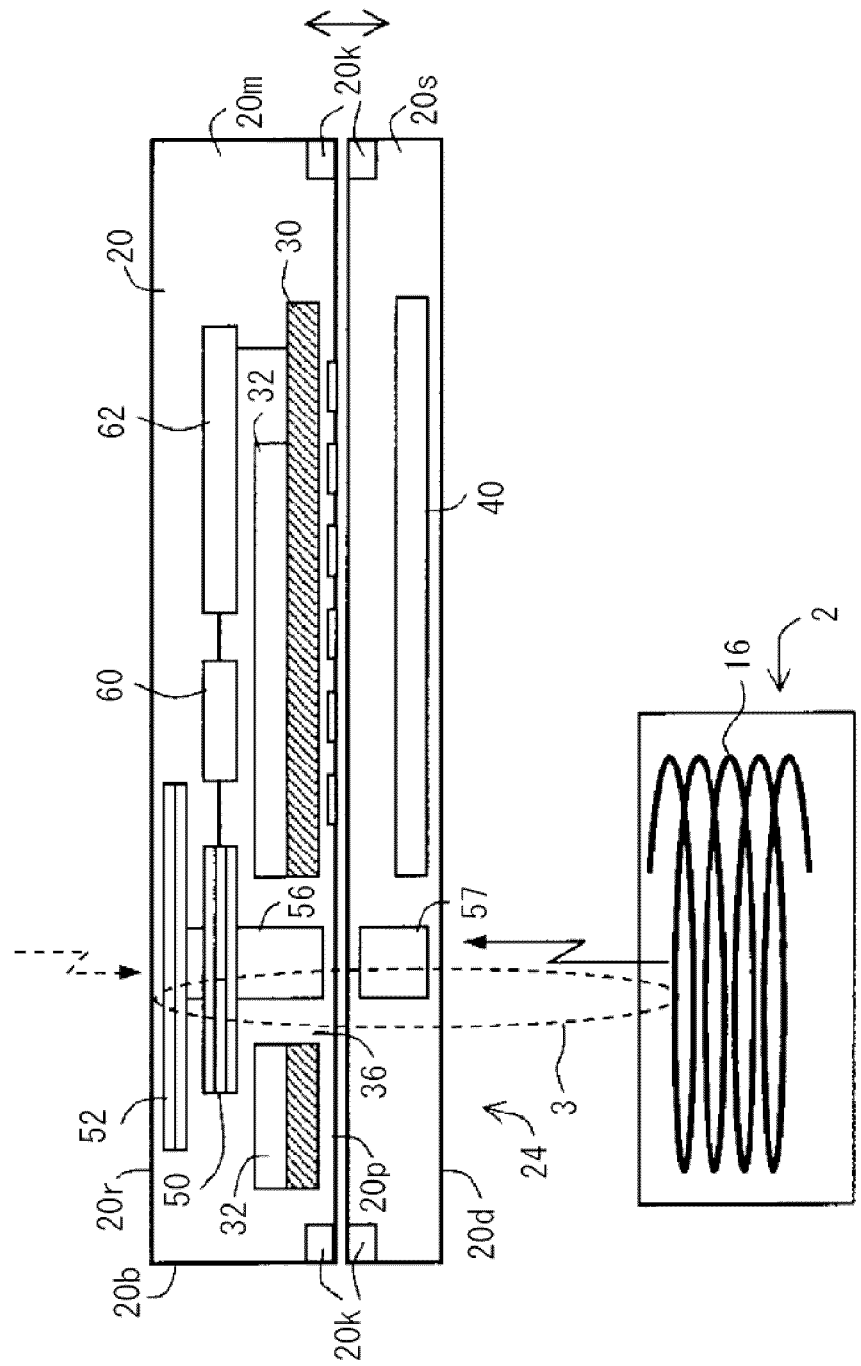
FIGS. 6A and 6B illustrate a still further schematic example of an internal structure of a cellular phone according to a still further embodiment, which can receive power with a wireless power supply method using magnetic resonance respectively through an outer surface of a primary power reception side, that of a secondary power reception side, and that of a tertiary power reception side of a housing or an outer sheath.
Figure 6B:
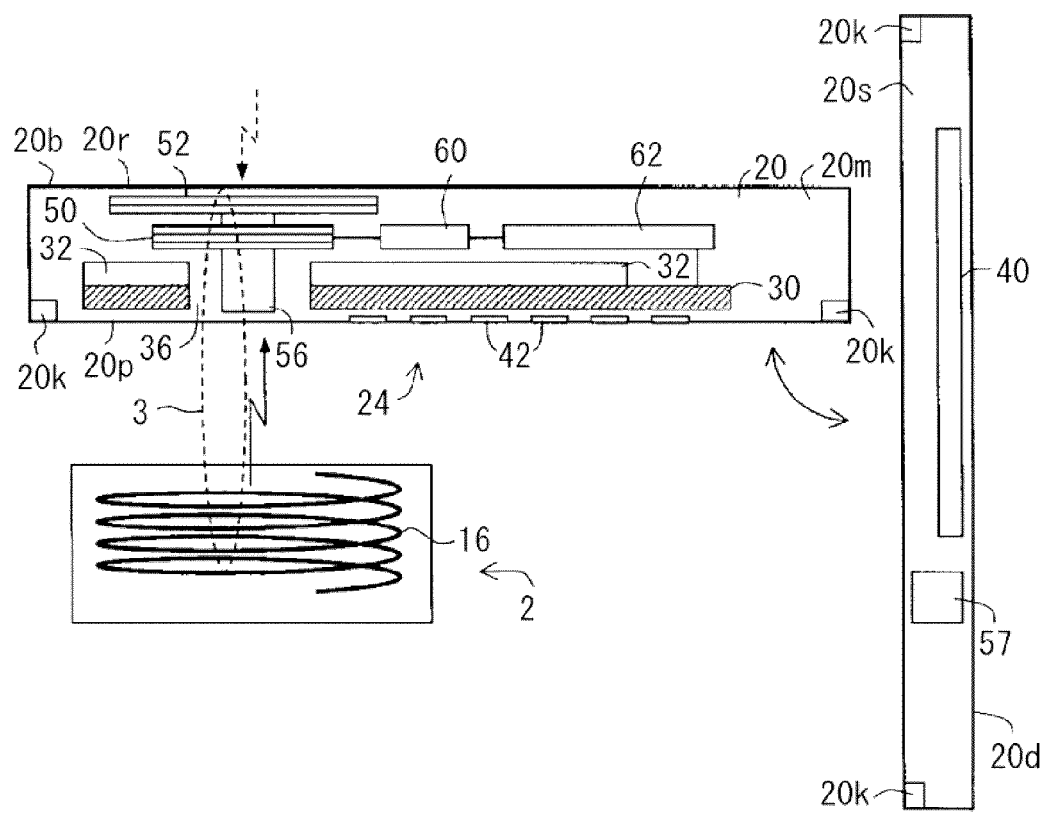

FIGS. 6A and 6B illustrate a still further example of an internal structure of a cellular phone 24 according to a still further embodiment, which can receive power respectively through an outer surface 20r of a primary power reception side and an outer surface 20p of a secondary power reception side of a housing 20b, and an outer surface 20d of a tertiary power reception side of a housing 20b' with a wireless power supply method using magnetic resonance. FIGS. 6A and 6B illustrate a further modification of the embodiment of FIGS. 1A and 1B or FIGS. 3A and 3B. In FIGS. 6A and 6B, the cellular phone 24 is illustrated in a form implemented by cutting away its side surface. In this case, the cellular phone 24 is a cellular phone of a detachment type or a separation type.

In FIG. 6A, the cellular phone 24 is arranged to receive power from the power transmission device 2 through the outer surface 20d of the tertiary power reception side with a wireless power supply method using magnetic resonance in an attached state. In FIG. 6B, the cellular phone 24 is arranged to receive power from the power transmission device 2 through the outer surface 20p of the secondary power reception side with a wireless power supply method using magnetic resonance in a detached state.

The cellular phone 24 has a form implemented by partitioning the cellular phone 20 of FIGS. 1A and 1B into a main unit 20m and a display unit 20s, similarly to the form of the embodiment of FIGS. 4A and 4B. The main unit 20m and the display unit 20s can be physically attached to each other with a permanent magnet 20k that is provided as a linking member. The main unit 20m and the display unit 20s communicate with each other via a short-range wireless communication unit (not illustrated) according to a short-range wireless communication standard such as a Bluetooth standard.

In FIG. 6A, in an arrangement where the display unit 20s is attached to overlay on the main unit 20m, another core 57 is arranged coaxially with the core 56 in an extended line of the axis of the core 56 within the main unit 20m in the display unit 20s.

The core 57 within the display unit 20s is present on the power transmission path 3 from the power transmission resonance coil 16 to the core 56 and to the power reception resonance coil 52. Therefore, power can be efficiently supplied from the outer surface 20d of the tertiary power reception side to the power reception resonance coil 52 through the core 57 and the core 56 even if the display unit 20s lies before the outer surface 20p of the secondary power reception side.

A power reception form of the cellular phone 24 in FIG. 6B corresponds to that of the cellular phone 20 in FIG. 1B or the cellular phone 20 in FIG. 3B. The rest of the structure, materials, and operations of the cellular phone 24 of FIGS. 6A and 6B are similar to those of FIGS. 1A and 1B.

FIGS. 7A and 7B illustrate examples of a shape of cores 562 and 564 used as the core 56. The core 562 has a shape of, for example, a solid cylinder made of ferrite. The core 564 has a shape of, for example, a hollow cylinder or elliptic cylinder made of ferrite. By using the core 564 of the hollow cylinder or elliptic cylinder, weights of the cellular phones 20 to 24 can be further reduced. The cores 562 and 564 may respectively be of solid and hollow polygonal prisms such as a square prism.

Figure 8A:
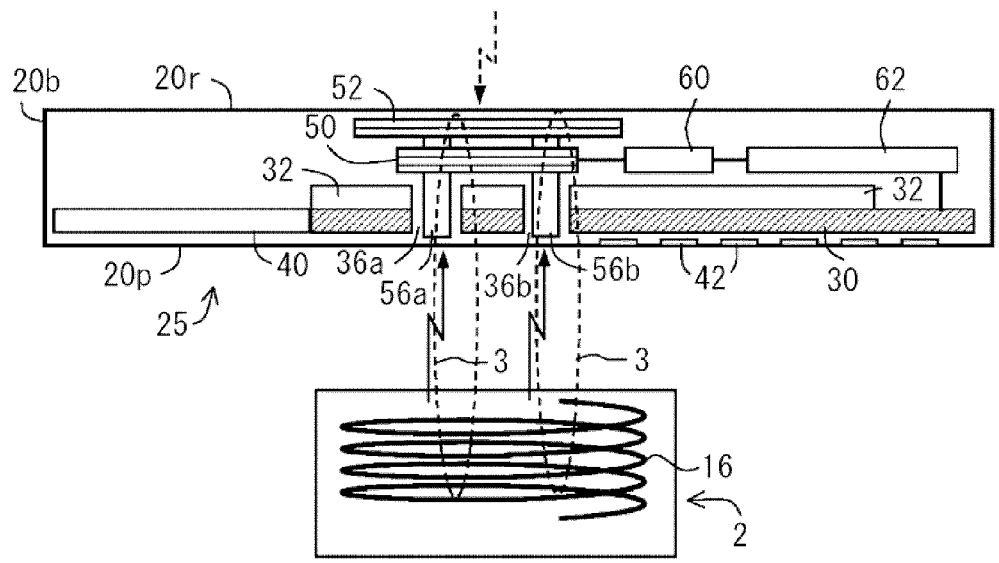
FIG. 8A illustrates a still further schematic example of an internal structure of a cellular phone according to a still further embodiment, which can receive power through both of an outer surface of a primary power reception side and that of a secondary power reception side of a housing or an outer sheath with a wireless power supply method using magnetic resonance.

FIG. 8A illustrates an example of an internal structure of a cellular phone 25 according to a still further embodiment, which can receive power through both of an outer surface 20r of a primary power reception side and an outer surface 20p of a secondary power reception side of a housing or an outer sheath 20b with a wireless power supply method using magnetic resonance. FIG. 8A illustrates a further modification of the embodiment of FIGS. 1A and 1B. In FIG. 8A, the cellular phone 25 is illustrated in a form implemented by cutting away its side surface.

Figure 8B:
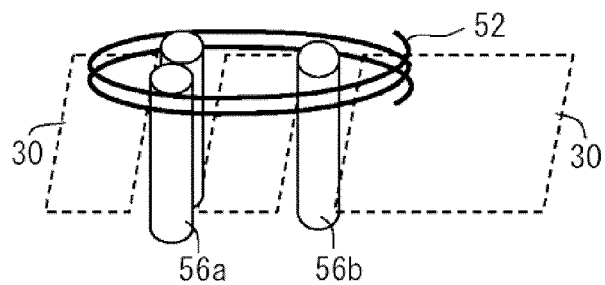
FIG. 8B illustrates an arrangement of a plurality of cores for a power reception resonance coil.

FIG. 8B illustrates an arrangement of a plurality of cores 56a and 56b for the power reception resonance coil 52.

In this case, a plurality of openings or spaces 36a, 36b in which the plurality of cores 56a, 56b are made to penetrate are respectively formed on the printed circuit board 30. The plurality of cores 56a, 56b are arranged in the openings 36a, 36b inside the power reception resonance coil 52 on the printed circuit board 30. Shapes of the cores 56a, 56b may be an elliptic cylinder or a square prism. By using the plurality of cores 56a and 56b in this way, a larger core volume for passing the magnetic field 3 can be secured according to the number and the shape of the openings 36a, 36b formable on the printed circuit board 3.

The rest of the structure, materials and operations of the cellular phone 25 of FIG. 8A are similar to those of FIGS. 1A and 1B.

FIG. 9A illustrates a still further example of an internal structure of a cellular phone 26 according to a still further embodiment, which can receive power through both of an outer surface 20r of a primary power reception side and an outer surface 20p of a secondary power reception side with a wireless power supply method using magnetic resonance. FIG. 9A illustrates a further modification of the embodiment of FIGS. 1A and 1B. In FIG. 9A, the cellular phone 26 is illustrated in a form implemented by cutting away its side surface.

In FIG. 9A, a magnetic plate, sheet or plate part 58, which surrounds a plurality of keys 42 and has a plurality of openings for the plurality of keys 42, is arranged between the printed circuit board 30 and an area where the keys 42 on the outer surface 20p of the secondary power reception side are arranged. The plate 58 is arranged integrally in contact or connection with the core 56 on the outer surface 20p side of the secondary power reception side.

FIG. 9B illustrates a shape of the magnetic plate 58 as an extended portion of the core 56.

The plate 58 is formed with a magnetic material having a high magnetic permeability such as ferrite. The plate 58 may have a thickness of, for example, approximately 0.01 to 1 mm. By arranging the magnetic plate 58 on the outer surface 20p side of the secondary power reception side as another magnetic element or member that forms a magnetic circuit, a wider area for passing the magnetic field 3 to the power reception resonance coil 52 can be secured.

The rest of the structure, materials and operations of the cellular phone 26 of FIG. 9A are similar to those of FIGS. 1A and 1B.

Figure 10A:
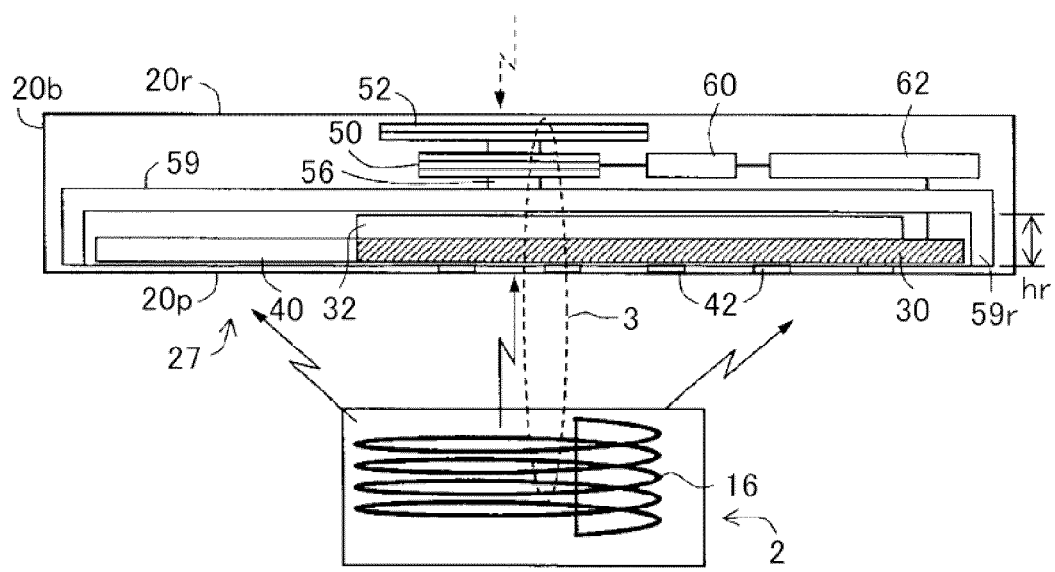
FIG. 10A illustrates a still further schematic example of an internal structure of a cellular phone according to a still further embodiment, which can receive power through both of an outer surface of a primary power reception side and that of a secondary power reception side of a housing or an outer sheath with a wireless power supply method using magnetic resonance.

FIG. 10A illustrates a still further example of an internal structure of a cellular phone 27 according to a still further embodiment, which can receive power through both of an outer surface 20r of a primary power reception side and an outer surface 20p of a secondary power reception side of a housing or an outer sheath 20b with a wireless power supply method using magnetic resonance. FIG. 10A illustrates a modification of the embodiment of FIG. 3. In FIG. 10A, the cellular phone 27 is illustrated in a form implemented by cutting away its side surface.

In FIG. 10A, a magnetic plate 59 having a protrusion part or wall part 59r, which protrudes toward the outer surface 20p side of the secondary power reception side in a perimeter portion or edge portion of a bottom surface within a concave portion, is arranged on a back surface of the printed circuit board 30, on which the circuit elements 32 are mounted, as another magnetic element or member that forms a magnetic circuit. The plate 95 may have a thickness of, for example, approximately 0.01 to 1 mm. The protrusion part 59r may have a height hr of, for example, approximately 1 to 10 mm. In FIG. 10A, the plate 59 is illustrated in a form implemented by removing its frontward protrusion part 59r. The plate 59 is arranged, on its back side, integrally in contact or connection with the core 56 on the outer surface 20p side of the secondary power reception side.

Figure 10B:
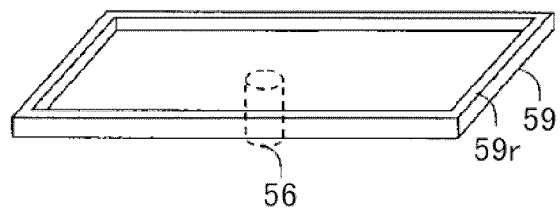
FIG. 10B illustrates the shape of a magnetic plate having a concave portion as an extended portion of a core.

FIG. 10B illustrates a shape of the magnetic plate 59 having a concave portion as an extended portion of the core 56.

The plate 59 is formed with a magnetic material having a high magnetic permeability, such as ferrite. Generally, the printed circuit board 30 is arranged in the wide concave portion of the plate 59. The coupled magnetic field 3 passes through a peripheral portion of the protrusion of the plate 59, a flat main bottom plate portion of the plate via (a gap between conductors) a non-conductor area portion of the printed circuit board 30 and a non-conductor area of the display device 40, and further passes through the core 56.

By arranging the magnetic plate 59 on the back surface of the printed circuit board 30 on the outer surface 20p side of the secondary power side, a wider area for passing the magnetic field 3 to the power reception resonance coil 52 can be secured even if the printed circuit board 30 is forced to be arranged between the power transmission resonance coil 16 and the power reception resonance coil 52.

The rest of the structure, materials and operations of the cellular phone 27 of FIG. 10A are similar to those of FIGS. 1A and 1B.

It is evident that the embodiments of FIGS. 7A to 10B are also applicable to the partitioned cellular phones 22, 23 and 24 of FIGS. 4A to 6B.

As described above, in each of the cellular phones 20 to 27 of FIGS. 1A to 10B, the coupled magnetic field 3 concentratedly passes through the magnetic cores 56, 57, 56a, 56b and 58 and the magnetic plates 58 and 59, so that the coupled magnetic field 3 passes from one surface of the housing 20b, 20b' to an opposite surface. Accordingly, a plurality of cellular phones (20 to 27) are stacked to form a magnetic circuit that connects the cores in series, the coupled magnetic field 3 concentratedly passes through the cores, whereby power can be simultaneously supplied to the cellular phones (20 to 27).

According to the above described embodiments, reception power in a case where power is received through the outer surface 20p of the secondary power reception side of the cellular phones 20 to 27 can be received by approximately 70 to 90 percent of that in a case (on a base of 100 percent) where power is received through the outer surface 20r of the primary power reception side. In contrast, reception power in a case where neither the core 56 nor the opening 36 is provided can be received by only 40 to 45 percent of that in the case where power is received through the outer surface 20r of the primary power reception side.

It is evident that the structures, materials and operations of the above described embodiments are applicable to other electronic devices such as a portable communication device, and an information device. Such portable electronic devices may be a PHS telephone, a cordless child phone, a portable wireless transceiver, a portable wireless transmitter/receiver, a portable personal computer, a handheld personal computer, a palm-size personal computer, a portable information terminal, a PDA, or a portable game machine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, various changes, substitutions, and alterations could be made hereto without departing from the spirit and scope of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and infe- riority of the invention. Although one or more embodiments) of the present invention have been described in detail, it should be understood that the various changes, substitutions, and alterations could be made hereto without departing from the spirit and scope of the invention.

According to one aspect of the embodiments of the present invention, a cellular phone that can receive power through both surfaces of a housing with a wireless power supply method using magnetic resonance can be realized. Moreover, even if one cellular phone stacks onto one or more cellular phones, power can be supplied simultaneously to the cellular phones.

What is claimed is:

1. A cellular phone, comprising:
    a housing;
    a power reception resonance coil that receives transmitted magnetic field energy with magnetic resonance and is arranged inside a first outer surface side of the housing;
    a power extracting unit for extracting power of an induction current generated by the power reception resonance coil;
    a magnetic core that has one end arranged inside the first outer surface side of the housing and the other end arranged inside a second outer surface side of the housing opposite to the first outer surface, and penetrates into the power reception resonance coil; and
    a printed board which is arranged in a space between the first outer surface and the second outer surface of the housing, on which circuit elements are mounted, and which has an area where circuit elements are not arranged on a periphery of the core.

2. The cellular phone according to claim 1, wherein the printed board has an opening in the area.

3. The cellular phone according to claim 1, further comprising
    another magnetic member forming a magnetic circuit along with the core.

4. The cellular phone according to claim 1, further comprising:
    a second housing arranged to overlay on the housing as a first housing; and
    another magnetic core within the another housing at a position where the another magnetic core overlays on the core within the first housing if the first housing and the second housing are arranged to overly.

5. The cellular phone according to claim 1, wherein the core is hollow.

6. The cellular phone according to claim 1, further comprising
    a plurality of cores penetrating into respective openings of the printed board.

7. The cellular phone according to claim 1, further comprising
    a magnetic plate connected to the core inside the second outer surface side of the housing.

8. The cellular phone according to claim 1, further comprising
    a magnetic plate connected to the core within the housing between the second outer surface and the printed board.

9. The cellular phone according to claim 1, further comprising
    a magnetic plate, which is connected to the core and has an edge portion protruding toward the second outer surface, within the second outer surface side of the housing.

10. The cellular phone according to claim 1, wherein the first outer surface and the second outer surface are outer surfaces opposite to each other of the housing.

* * * * *

UNITED STATES PATENT AND TRADEMARK OFFICE
CERTIFICATE OF CORRECTION

PATENT NO.        : 8,666,459 B2
APPLICATION NO.   : 13/611958
DATED             : March 4, 2014
INVENTOR(S)       : Kiyoto Matsui It is certified that error appears in the above-identified patent and that said Letters Patent is hereby corrected as shown below:

In the Claims:

Claim 4, Col. 14, line 13, delete "overly" and insert --overlay--.

Signed and Sealed this
Thirtieth Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,666,459 B2 | Page 1 of 1 |
| APPLICATION NO. | : 13/611958 | |
| DATED | : March 4, 2014 | |
| INVENTOR(S) | : Kiyoto Matsui | |

It is certified that error appears in the above-identified patent and that said Letters Patent is hereby corrected as shown below:

In the Claims:

Claim 4, Col. 14, line 42, delete "overly" and insert --overlay--.

This certificate supersedes the Certificate of Correction issued September 30, 2014.

Signed and Sealed this
Twenty-first Day of October, 2014

Michelle K. Lee
*Deputy Director of the United States Patent and Trademark Office*